United States Patent
Lee et al.

(10) Patent No.: US 9,638,839 B2
(45) Date of Patent: May 2, 2017

(54) OPTICAL ZOOM PROBE

(71) Applicant: SAMSUNG ELECTRONICS CO., LTD., Suwon-si (KR)

(72) Inventors: Eun-sung Lee, Hwaseong-si (KR); Woon-bae Kim, Seoul (KR); Seung-wan Lee, Suwon-si (KR); Jong-hyeon Chang, Suwon-si (KR); Min-seog Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 27 days.

(21) Appl. No.: 14/550,192

(22) Filed: Nov. 21, 2014

(65) Prior Publication Data

US 2015/0138648 A1 May 21, 2015

(30) Foreign Application Priority Data

Nov. 21, 2013 (KR) .................. 10-2013-0142376

(51) Int. Cl.
*G02B 3/14* (2006.01)
*G02B 7/04* (2006.01)
*G02B 23/24* (2006.01)
*G02B 7/10* (2006.01)

(52) U.S. Cl.
CPC .............. *G02B 3/14* (2013.01); *G02B 7/04* (2013.01); *G02B 7/102* (2013.01); *G02B 23/2438* (2013.01); *Y10T 29/49002* (2015.01)

(58) Field of Classification Search
CPC .......... G02B 3/12; G02B 3/14; G02B 3/0081; G02B 7/04; G02B 7/08; G02B 7/102; G02B 23/2438

USPC .......................................... 359/665–666, 676
See application file for complete search history.

(56) References Cited

U.S. PATENT DOCUMENTS

| 4,805,598 A * | 2/1989 | Ueda ................. A61B 1/00091 359/665 |
| 6,404,560 B1 * | 6/2002 | Hori ....................... G02B 7/007 359/665 |
| 6,507,700 B1 * | 1/2003 | Takekuma ............. G03B 17/08 348/81 |
| 6,749,559 B1 | 6/2004 | Kraas et al. |
| 2007/0256943 A1 | 11/2007 | Popovich et al. |
| 2009/0116118 A1 * | 5/2009 | Frazier ..................... G02B 3/14 359/666 |

(Continued)

FOREIGN PATENT DOCUMENTS

KR    10-2012-0035386 A    4/2012

OTHER PUBLICATIONS

Weber, et al.; "A Tunable Optofluidic Silicon Optical Bench", Journal of Microelectromechanical Systems, Dec. 2012, vol. 21, No. 6, 8 pages total.

(Continued)

*Primary Examiner* — Jordan Schwartz
(74) *Attorney, Agent, or Firm* — Sughrue Mion, PLLC

(57) ABSTRACT

An optical zoom probe is disclosed. The optical zoom probe includes: at least one liquid lens having a focus which is configured to be adjusted according to a flow of a fluid through a flow path; and a barrel provided to form the flow path and including a narrowed first end part including a first opening through which an image is captured, the at least one liquid lens being provided inside the barrel.

16 Claims, 4 Drawing Sheets

(56) References Cited

U.S. PATENT DOCUMENTS

| | | | |
|---|---|---|---|
| 2011/0002043 A1* | 1/2011 | Seo | G02B 3/14 |
| | | | 359/666 |
| 2012/0081795 A1 | 4/2012 | Choi et al. | |
| 2012/0327286 A1* | 12/2012 | Imura | G03B 17/00 |
| | | | 348/335 |
| 2014/0194750 A1* | 7/2014 | Lee | A61B 5/0064 |
| | | | 600/476 |

OTHER PUBLICATIONS

Shaw, et al.; "Design and Analysis of an Asymmetrical Liquid-Filled Lens", Optical Engineering, Dec. 2007, vol. 46, No. 12, 8 pages total.

* cited by examiner

OPTICAL ZOOM PROBE

CROSS-REFERENCE TO RELATED APPLICATIONS

This application claims the benefit of Korean Patent Application No. 10-2013-0142376, filed on Nov. 21, 2013, in the Korean Intellectual Property Office, the disclosure of which is incorporated herein in its entirety by reference.

BACKGROUND

1. Field

One or more exemplary embodiments relate to an optical zoom probe, and more particularly, to an optical zoom probe having a liquid lens.

2. Description of the Related Art

In the field of medical imaging, demand for a technique of precisely photographing cross-sectional layers under the surface of tissue (e.g., skin of a human body) together with obtaining information on the surface of the tissue has increased. Specifically, since most cancers are generated at a lower part of epithelial cells and metastasize into dermal cells in which blood vessels exist, if the cancers are discovered early, damage due to the cancers may be dramatically reduced. Existing imaging techniques, such as magnetic resonance imaging (MRI), X-ray computed tomography (CT), ultrasound waves, and the like, may be used to photograph cross-sectional layers under the skin by passing through the skin, but resolutions thereof are low, and thus, early stage cancer having a small size cannot be detected. However, unlike the existing methods, since an optical coherence tomography (OCT) technique introduced in recent days uses light, a skin penetration depth thereof is as low as about 2 to 3 mm, but resolution thereof is as high as about ten times that of an ultrasound wave, and thus, it is expected that the OCT technique may be useful for diagnosis of early stage cancer having a size of about 50 to about 100 µm.

Not only with respect to the OCT technique but also in various other fields using an optical device, there are demands regarding adjustment of a focusing location of light or adjustment of a size of an optical spot to be irradiated, and there is also a demand for miniaturization of the optical device.

Liquid lenses have been developed to meet the demands regarding focal distance adjustment, a zoom function, and miniaturization.

SUMMARY

One or more exemplary embodiments include an optical zoom probe having a liquid lens, which has been miniaturized.

Additional aspects will be set forth in part in the description which follows and, in part, will be apparent from the description, or may be learned by practice of the presented exemplary embodiments.

According to an aspect of an exemplary embodiment, there is provided an optical zoom probe including: at least one liquid lens having a focus which is configured to be adjusted according to a flow of a fluid through a flow path; and a barrel provided to form the flow path and including a narrowed first end part having a first opening through which an image is captured, wherein the at least one liquid lens is provided inside the barrel.

The narrowed first end part includes a protrusion disposed inside the barrel, wherein elements including the at least one liquid lens are stacked on the protrusion.

The optical zoom member may further include a groove provided in an outer surface of the barrel.

The groove may be used as the flow path.

The optical zoom probe may further include a cover member wrapped around the barrel, wherein the cover member covers the groove to thereby form the flow path.

The optical zoom probe may further include at least one tube provided on the groove so as to form the flow path and connected to the at least one liquid lens by a tube plug so as to enable the flow of the fluid.

The optical zoom probe may further include a groove which is formed along outer surfaces of elements, including the at least one liquid lens, provided inside the barrel, and at least one tube provided on the groove so as to form the flow path and connected to the at least one liquid lens by a tube plug so as to enable the flow of the fluid.

The optical zoom probe may further include: a cover member wrapped around the barrel; and a lid including a transparent window formed of a transparent material, wherein when the lid is coupled to the cover member, the lid is configured to seal elements, including the at least one liquid lens, inside the barrel, and further seal the flow path.

The optical zoom probe may further include a compression spacer provided between the lid and the at least one liquid lens, wherein when the lid is coupled to the cover member, the compression spacer is configured to press elements, including the at least one liquid lens, provided inside the barrel.

The cover member may include a narrowed second end part including a second opening at a portion of the narrowed second end part coupled to the lid, and the lid may be coupled to the second end part.

An external diameter of the lid may correspond to an external diameter of the cover member.

The at least one liquid lens may include: a transparent plate; a lens barrel including a fluid filled therein and a hole in a side surface of the lens barrel so as to enable the fluid to pass through the flow path; and a transparent membrane member located at an opposite side of the lens barrel from a side of the lens barrel at which the transparent plate is provided, the transparent membrane member being formed to have a curved surface, and a curvature that changes according to an amount of the fluid filled in the lens barrel.

The transparent plate, the lens barrel, and the transparent membrane member are provided plurally, and the at least one liquid lens may include a first liquid lens and a second liquid lens respectively including a corresponding one of the transparent plate, the lens barrel, and the transparent membrane member, and a spacer may be located between the first liquid lens and the second liquid lens.

The optical zoom probe may further include an optical transmitter, which includes an optical fiber and a scanner for controlling the optical fiber to change a traveling path of light travelling towards the at least one liquid lens, the optical transmitter being provided between the narrowed first end part of the barrel and the at least one liquid lens.

The optical fiber may be provided so as to pass through the first opening of the narrowed first end part.

The transparent plate, the lens barrel, and the transparent membrane member are provided plurally, and the at least one liquid lens may include a first liquid lens and a second liquid lens respectively including a corresponding one of the transparent plate, the lens barrel, and the transparent membrane member, and the optical zoom probe may further include a spacer provided between the first liquid lens and the second liquid lens.

According to another aspect of an exemplary embodiment, there is provided a method of assembling the optical zoom probe including: assembling the optical zoom probe in a fluid; and sealing the at least one liquid lens and the flow path by compression during the assembling of the optical zoom probe in the fluid.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
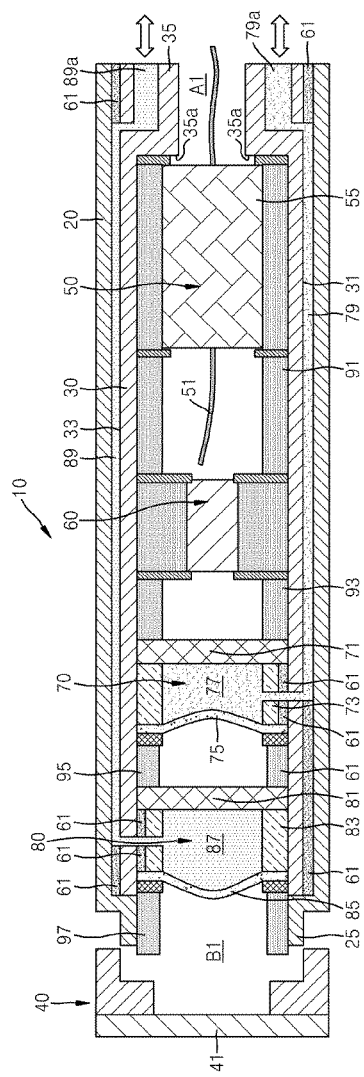
FIG. 1 is a cross-sectional view of an optical zoom probe according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the exemplary embodiments.

Figure 2:
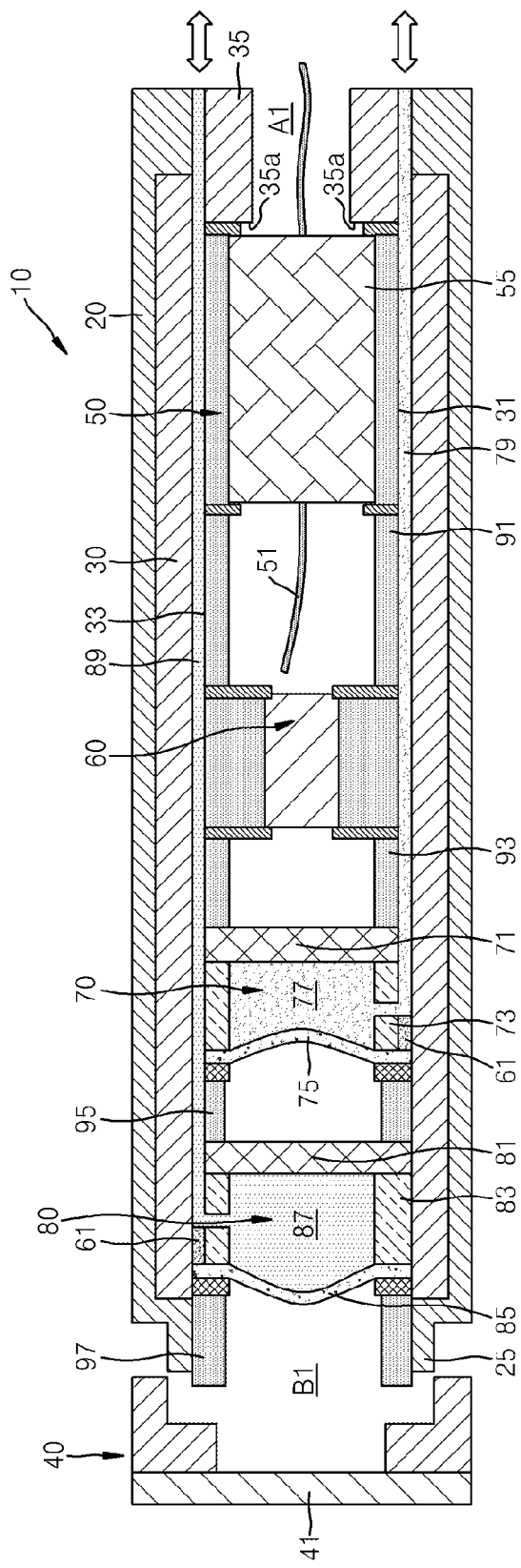
FIG. 2 is a cross-sectional view of an optical zoom probe according to another exemplary embodiment.

FIG. 1 is a cross-sectional view of an optical zoom probe 10 according to an exemplary embodiment. FIG. 2 is a cross-sectional view of the optical zoom probe 10 according to another exemplary embodiment. Hereinafter, a case where the optical zoom probe 10 according to the present exemplary embodiments includes two liquid lenses, e.g., a first liquid lens 70 and a second liquid lens 80, will be described with reference to FIGS. 1 and 2. In the optical zoom probe 10 according to the present exemplary embodiments, the number of liquid lenses may vary according to circumstances, and accordingly, a mechanical structure of the optical zoom probe 10 inserted into and mounted inside a barrel 30 may vary.

Referring to FIGS. 1 and 2, the optical zoom probe 10 includes at least one liquid lens of which a focus is adjusted according to a flow of a fluid along a flow path and the barrel 30 which includes a narrowed first end part 35 provided to form the flow path and having a first opening A1 and in which elements including the at least one liquid lens are inserted and mounted. The at least one liquid lens may include, for example, the first liquid lens 70 and the second liquid lens 80. A spacer 95 may be located between the first liquid lens 70 and the second liquid lens 80. The optical zoom probe 10 may further include an optical transmission unit 50 (e.g., optical transmitter). The optical transmission unit 50 may include an optical fiber 51 and a scanner 55 located between the first end part 35 of the barrel 30 and the first liquid lens 70. In addition, the optical zoom probe 10 may further include a lens unit 60 (e.g., lens) between the first liquid lens 70 and an end part of the optical fiber 51 as shown in FIG. 1.

In the optical zoom probe 10 according to the present exemplary embodiments, the barrel 30 may be wrapped by a cover member 20. The cover member 20 may be coupled to a lid 40 having a transparent window 41 formed of a transparent material.

As shown in FIGS. 1 and 2, the elements of the optical zoom probe 10, which are inserted into and mounted inside the barrel 30, may include not only optical components including the first liquid lens 70 and the second liquid lens 80, but also various mechanical parts for forming an assembly, such as spacers 91, 93, and 95 for spacing between the optical components, a compression spacer 97, a sealing pad 61, and the like.

The barrel 30 is used to insert and mount the elements, e.g., the first and second liquid lenses 70 and 80, the lens unit 60, the optical transmission unit 50, and the like, therein, and a protrusion 35a of the first end part 35 may be used as a seating surface for mounting the elements inside the barrel 30. For example, as shown in FIGS. 1 and 2, the scanner 55 of the optical transmission unit 50 is seated on the protrusion 35a of the first end part 35, and then, the lens unit 60, the first liquid lens 70, and the second liquid lens 80 may be sequentially disposed. In this case, the spacers 91, 93, and 95 may be located between the scanner 55 and the lens unit 60, between the lens unit 60 and the first liquid lens 70, and between the first liquid lens 70 and the second liquid lens 80, respectively.

Referring to FIG. 1, a depressively formed groove for forming a flow path may be provided in the outer surface of the barrel 30. When the optical zoom probe 10 according to an exemplary embodiment includes the first liquid lens 70 and the second liquid lens 80 as the at least one liquid lens, according to an exemplary embodiment, a liquid is input to and output from the first liquid lens 70 and the second liquid lens 80 through flow paths 79 and 89, respectively, and thus, first and second grooves 31 and 33 may be formed in the outer surface of the barrel as shown in FIG. 1.

Figure 3:
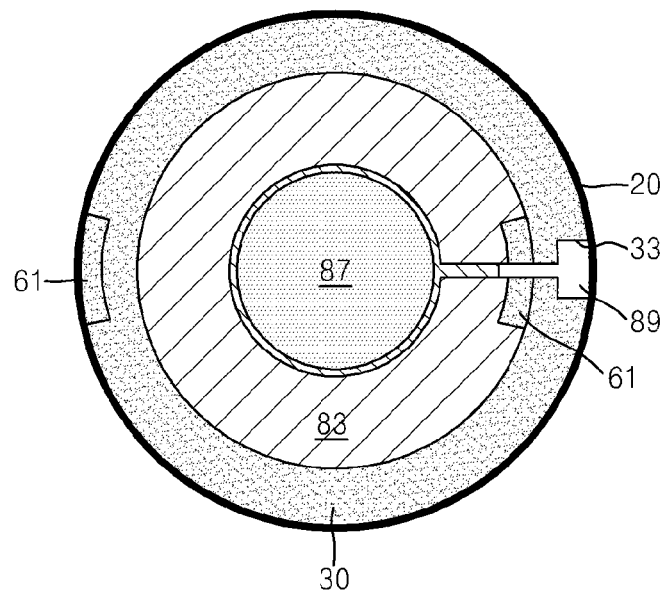
FIG. 3 is a cross-sectional view of a case where a cover member is tightly disposed on a barrel, and first and second grooves are used as flow paths.

In this case, the first and second grooves 31 and 33 formed as a depressive structure in the outer surface of the barrel 30 may be used as the flow paths 79 and 89. FIG. 3 is a cross-sectional view of a case where the cover member 20 is tightly disposed on the barrel 30 so that the first and second grooves 31 and 33 are used as the flow paths 79 and 89. FIG. 3 is a cross-sectional view cut to show the flow path 89 of the second liquid lens 80.

Figure 4:
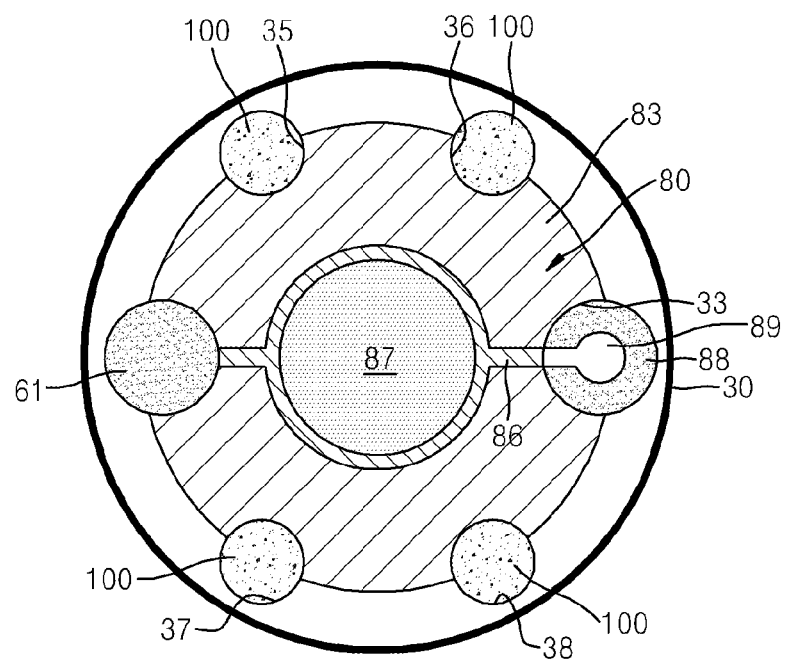
FIG. 4 is a cross-sectional view of a case where two or more grooves including first and second grooves are formed in outer surfaces of elements, and a tube is inserted into the first and second grooves and used as flow paths.

The first and second grooves 31 and 33 for forming the flow paths 79 and 89 may be formed as a depressive structure in the outer surfaces of the elements inserted into and mounted in the barrel 30 as shown in FIG. 4, instead of formed in the outer surface of the barrel 30. In this case, a tube 88 may be inserted into and mounted on each of the first and second grooves 31 and 33 depressively formed in the outer surfaces of the elements so as to form the flow paths 79 and 89. FIG. 4 is a cross-sectional view cut to show the flow path 89 of the second liquid lens 80. In this case, a tube plug 86 may individually connect the first liquid lens 70 and one tube and the second liquid lens 80 and another tube so as to achieve a flow of a fluid.

That is, when the first liquid lens 70 and the second liquid lens 80 are included as the at least one liquid lens, according to an exemplary embodiment, a liquid is input to and output from the first liquid lens 70 and the second liquid lens 80 through the flow paths 79 and 89, respectively, and thus, two or more grooves including the first and second grooves 31 and 33 may be formed along the outer surfaces of the elements, the tube 88 may be inserted into each of the first and second grooves 31 and 33, and the tube plug 86 may individually connect the first liquid lens 70 and one tube and the second liquid lens 80 and another tube.

FIG. 4 is a cross-sectional view of a case where two or more grooves including the first and second grooves 31 and 33 are formed in the outer surfaces of the elements, and the tube 88 is inserted into the first and second grooves 31 and 33 and used as the flow paths 79 and 89. FIG. 4 illustrates a case where grooves 35, 36, 37, and 38 are additionally formed in the outer surfaces of the elements besides the first and second grooves 31 and 33, and guide rods 100 are located at the locations of the added grooves 35, 36, 37, and 38 so that the grooves 35, 36, 37, and 38 formed in the outer surfaces of the elements are guided by the guide rods 100 to arrange the elements in a line when the elements are assembled in the barrel 30. The guide rods 100 may be removed after the arrangement of the elements.

As described with reference to FIGS. 1 and 3, even when the first and second grooves 31 and 33 are formed in the outer surface of the barrel 30, a tube may be inserted into and mounted on each of the first and second grooves 31 and 33 so as to form the flow paths 79 and 89. In this case, to achieve a flow of a fluid, a tube plug may individually connect the first liquid lens 70 and one tube and the second liquid lens 80 and another tube so as to facilitate the flow of the fluid. That is, according to an exemplary embodiment, a fluid is input into and output from each of the first liquid lens 70 and the second liquid lens 80 through a flow path, two or more grooves including the first and second grooves 31 and 33 may be formed in the outer surface of the barrel 30, a tube may be inserted into each of the first and second grooves 31 and 33, and a tube plug may individually connect the first liquid lens 70 and one tube and the second liquid lens 80 and another tube.

The optical zoom probe 10 according to the present exemplary embodiments may further include the cover member 20 wrapping around the barrel 30 and the lid 40 having the transparent window 41 formed of a transparent material, and when the lid 40 is coupled to the cover member 20, the elements arranged inside the barrel 30 are pressed to seal the first and second liquid lenses 70 and 80 and the flow paths 79 and 89.

For example, the compression spacer 97 is further provided between the lid 40 and the second liquid lens 80, wherein when the lid 40 is coupled to the cover member 20, the elements arranged inside the barrel 30 are pressed to seal the first and second liquid lenses 70 and 80 and the flow paths 79 and 89 by the compression spacer 97.

To couple the lid 40 to the cover member 20, the cover member 20 may have a narrowed second end part 25 having a second opening B1 at a portion coupled to the lid 40, and the lid 40 may be coupled to the second end part 25. For example, a screw pattern may be formed on the outer circumferential surface of the second end part 25 of the cover member 20 and the corresponding inner circumferential surface of the lid 40 to thereby screw-couple the lid 40 to the second end part 25 of the cover member 20.

As such, if a portion of the cover member 20 coupled to the lid 40 is formed with the narrowed second end part 25 having the second opening B1 so that the lid 40 is coupled to the second end part 25 of the cover member 20, the external diameter of the lid 40 may be formed to correspond to the diameter of the cover member 20. That is, the optical zoom probe 10 according to the present exemplary embodiments may be formed as a cylindrical structure having almost no change in diameter.

The barrel 30 may be formed as a single hollow body or as a structure having a plurality of partial barrels formed to be engaged with each other in a roughly semi-cylindrical shape. When the plurality of partial barrels is used, the elements to be inserted into the inside may be first arranged on one partial barrel, and then the other partial barrels may be coupled to the one partial barrel.

The cover member 20 may be formed as a single hollow body or a structure where a plurality of partial cover members, e.g., a first partial cover member and a second partial cover member, are formed to be engaged with each other in a roughly semi-cylindrical shape. In this case, after the first partial cover member is coupled to the barrel 30, the second cover member may be coupled to the barrel 30 so as to be engaged with the first partial cover member, and then the lid 40 may be coupled to the second end part 25 of the cover member 20.

In the optical zoom probe 10 according to the present exemplary embodiments, the first liquid lens 70 may include a transparent plate 71, a lens barrel 73 filled with a fluid 77 and having a hole in a side surface so as to input and output the fluid 77 through the flow path 79, and a transparent membrane member 75 located at an opposite side of the transparent plate 71 by interposing the lens barrel 73 between the transparent membrane member 75 and the transparent plate 71. In this case, the transparent membrane member 75 may be formed to have a curved surface and may be provided so that a curvature of the transparent membrane member 75 varies according to an amount of the fluid 77 filled in the lens barrel 73.

Likewise, in the optical zoom probe 10 according to the present exemplary embodiments, the second liquid lens 80 may include a transparent plate 81, a lens barrel 83 filled with a fluid 87 and having a hole in a side surface so as to input and output the fluid 87 through the flow path 89, and a transparent membrane member 85 located at an opposite side of the transparent plate 81 by interposing the lens barrel 83 between the transparent membrane member 85 and the transparent plate 81. In this case, the transparent membrane member 85 may be formed to have a curved surface and may be provided so that a curvature of the transparent membrane member 85 varies according to an amount of the fluid 87 filled in the lens barrel 83.

The transparent plates 71 and 81 may be formed of, for example, glass. The transparent membrane members 75 and 85 may be formed of, for example, a polydimethylsiloxane (PDMS) material. The transparent membrane members 75 and 85 may act as O-rings when the optical zoom probe 10 is assembled to thereby contribute to sealing of the first and second liquid lenses 70 and 80.

The lens unit 60 may be formed with a green lens or formed by one lens or a combination of two or more lenses.

In the optical transmission unit 50, one end of the optical fiber 51 may be assembled with the scanner 55. The scanner 55 is an actuator for inducing a change in the optical fiber 51 to change an optical path and, for example, may be formed as a piezo actuator or a cantilever using a piezo material, a shape memory alloy, or the like, and besides, the scanner 55 may be formed using various materials and methods.

In the optical zoom probe 10, the optical fiber 51 extends by passing through the first opening A1 of the first end part 35 of the barrel 30, and since the size of the optical fiber 51 is much less than the diameter of the optical zoom probe 10, the size of the first opening A1 may be reduced.

Therefore, when the first end part 35 of the barrel 30 is formed in a narrowed structure, as shown in FIGS. 1 to 4, inlets/outlets 79a and 89a of the flow paths 79 and 89 may be formed so as to be located inwards of the outermost external diameter of the barrel 30 at a portion of the first end part 35, and since the inlets/outlets 79a and 89a of the flow paths 79 and 89 are located along a longitudinal direction of the optical zoom probe 10, an area occupied by a liquid reservoir may be minimized, thereby miniaturizing the optical zoom probe 10.

In addition, since the first and second liquid lenses 70 and 80 are driven by using a flow of a fluid through the flow paths 79 and 89, an electrode part necessary for driving a liquid lens in typical liquid lenses is not required, according to exemplary embodiments. Therefore, unlike the typical liquid lenses, since the optical zoom probe 10 does not require a portion to house an electrode part, the optical zoom probe 10 may be relatively miniaturized.

When the optical zoom probe 10 according to the present exemplary embodiments is assembled in a fluid in an operation of sequentially inserting the elements inside the barrel 30, wrapping the barrel 30 with the cover member 20, and coupling the lid 40 to the second end part 25 of the cover member 20, the elements inserted inside the barrel 30 are compressed along the longitudinal direction of the optical zoom probe 10 by the compression spacer 97, thereby sealing the first and second liquid lenses 70 and 80 and the flow paths 79 and 89. In this case, since the assembling is performed in the fluid, the first and second liquid lenses 70 and 80 and the flow paths 79 and 89 may be filled with the fluid. At this time, the fluid may also be present in spaces where the spacers 91, 93, 95, and 97 are disposed. However, since the spaces where the spacers 91, 93, 95, and 97 are disposed are not sealed, if the optical zoom probe 10 is completely assembled and is dried up, the optical zoom probe 10 in which the fluid is present only inside the first and second liquid lenses 70 and 80 and the flow paths 79 and 89 may be obtained.

The optical zoom probe 10 according to the present exemplary embodiments, which has been described above, does not have to undergo an adhesive process and the like and may be completely sealed and assembled by being pressed according to the compression of the compression spacer 97 when the lid 40 is coupled to the second end part 25 of the cover member 20.

In addition, the optical zoom probe 10 according to the present exemplary embodiments does not have to include a mechanical moving part for driving a liquid lens and does not have to include a liquid reservoir unit or an electrode part oriented in a direction where a cross-sectional area is large, and thus, a cross-sectional area of the optical zoom probe 10 may be minimized, thereby implementing the miniaturized optical zoom probe 10 with a small thickness.

Cases where the optical zoom probe 10 includes two liquid lenses have been described with reference to FIGS. 1 and 2, but exemplary embodiments are not limited thereto, and the number of liquid lenses may increase according to circumstances. Even in this case, a flow path may be formed using grooves depressively formed in the outer surface of the barrel 30 or the outer surfaces of the elements inserted into and mounted inside the barrel 30, and thus, even though the number of flow paths increases, the cross-sectional area of the optical zoom probe 10 may remain almost unchanged.

In addition, although certain exemplary embodiments are described and shown such that the optical zoom probe 10 includes the lens unit 60 between the optical transmission unit 50 and the first liquid lens 70, the lens unit 60 may not be included, or a lens unit may be further included between the second liquid lens 80 and the transparent window 41 of the lid 40.

In addition, although certain exemplary embodiments have been described and shown such that the optical zoom probe 10 has a structure where the optical transmission unit 50 is inserted into and mounted inside the barrel 30, exemplary embodiments are not limited thereto, and the optical zoom probe 10 may have a structure where the optical transmission unit 50 is located outside the barrel 30, and light transmitted from the optical fiber 51 is transferred to the first liquid lens 70 through the first opening A1 of the first end part 30 of the barrel 30.

Figure 5:
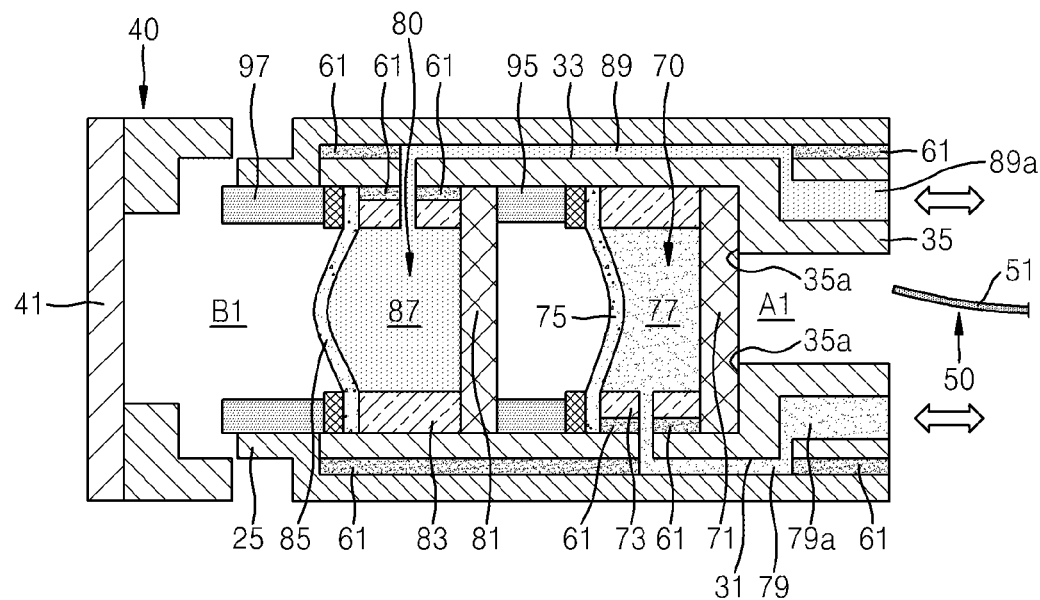
FIG. 5 is a cross-sectional view of a variable liquid lens system having a structure corresponding to the optical zoom probe of FIG. 1, according to an exemplary embodiment.
Figure 6:
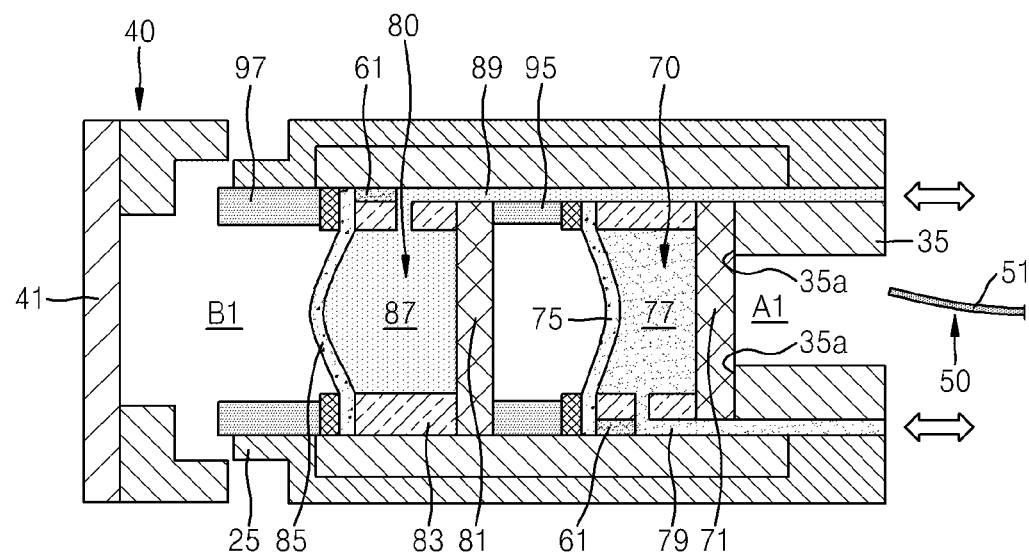
FIG. 6 is a cross-sectional view of a variable liquid lens system having a structure corresponding to the optical zoom probe of FIG. 2, according to another exemplary embodiment.

For example, as shown in FIGS. 5 and 6, a structure where only the first liquid lens 70 and the second liquid lens 80 are arranged as an optical configuration inside the barrel 30 may be formed according to an exemplary embodiment. FIG. 5 is a cross-sectional view of a variable liquid lens system having a structure corresponding to the optical zoom probe 10 of FIG. 1, according to an exemplary embodiment, and FIG. 6 is a cross-sectional view of a variable liquid lens system having a structure corresponding to the optical zoom probe 10 of FIG. 2, according to another exemplary embodiment. In this case, the optical zoom probe 10 according to the present exemplary embodiments may include the variable liquid lens system and the optical transmission unit 50. In FIGS. 5 and 6, the first liquid lens 70 may be seated on the protrusion 35a of the narrowed first end part 35 of the barrel 30, and the second liquid lens 80 may be seated by interposing the spacer 95 between the first liquid lens 70 and the second liquid lens 80.

As described above, according to the one or more of the above exemplary embodiments, an optical zoom probe may be configured so that an inlet/outlet of a flow path is located inwards of the outermost external diameter of a barrel, and since the inlet/outlet of the flow path is located along a longitudinal direction of the optical zoom probe, an area occupied by a liquid reservoir unit may be minimized, thereby miniaturizing the optical zoom probe.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. An optical zoom probe comprising:
    at least one liquid lens having a focal length which is configured to be adjusted according to a flow of a fluid through a flow path; and
    a barrel provided to form the flow path, the barrel comprising a narrowed first end part comprising a first opening through which an image is captured, the barrel defining a radial direction and a longitudinal direction, a cover member wrapped concentrically around the barrel,
wherein the at least one liquid lens is provided inside the barrel,
wherein a portion of the flow path is formed by the barrel in a direction parallel to the longitudinal direction,
wherein a groove is used as the flow path, and
wherein the cover member covers the groove to thereby form the flow path.

2. The optical zoom probe of claim 1, wherein the narrowed first end part comprises a protrusion disposed inside the barrel, wherein elements including the at least one liquid lens are stacked on the protrusion.

3. The optical zoom probe of claim 1, wherein the groove is parallel to the longitudinal direction provided in an outer surface of the barrel.

4. The optical zoom probe of claim 3, further comprising at least one tube provided on the groove so as to form the flow path and connected to the at least one liquid lens so as to enable the flow of the fluid to the at least one liquid lens.

5. The optical zoom probe of claim 1, further comprising:
a groove parallel to the longitudinal direction which is formed along outer surfaces of elements, including the at least one liquid lens, provided inside the barrel, and
at least one tube provided on the groove so as to form the flow path and connected to the at least one liquid lens so as to enable the flow of the fluid to the at least one liquid lens.

6. The optical zoom probe of claim 1, further comprising:
a cover member wrapped concentrically around the barrel; and
a lid comprising a transparent window formed of a transparent material,
wherein when the lid is coupled to the cover member, the lid is configured to seal elements, including the at least one liquid lens, inside the barrel, and further seal the flow path.

7. The optical zoom probe of claim 6, further comprising a compression spacer provided between the lid and the at least one liquid lens,
wherein when the lid is coupled to the cover member, the compression spacer is configured to compress elements, including the at least one liquid lens, provided inside the barrel.

8. The optical zoom probe of claim 6, wherein the cover member comprises a narrowed second end part comprising a second opening at a portion of the narrowed second end part coupled to the lid, and
the lid is coupled to the second end part.

9. The optical zoom probe of claim 8, wherein an external diameter of the lid corresponds to an external diameter of the cover member.

10. The optical zoom probe of claim 6, wherein the at least one liquid lens comprises:
a transparent plate;
a lens barrel comprising a fluid filled therein and a hole in a side surface of the lens barrel so as to enable the fluid to pass through the flow path; and
a transparent membrane member located at an opposite side of the lens barrel from a side of the lens barrel at which the transparent plate is provided, the transparent member being formed to have a curved surface and a curvature that changes according to an amount of the fluid filled in the lens barrel.

11. The optical zoom probe of claim 10, wherein the transparent plate, the lens barrel, and the transparent membrane member are provided plurally, and the at least one liquid lens comprises a first liquid lens and a second liquid lens respectively comprising a corresponding one of the transparent plate, the lens barrel, and the transparent membrane member, and
wherein the optical zoom probe further comprises a spacer provided between the first liquid lens and the second liquid lens.

12. The optical zoom probe of claim 6, further comprising an optical transmitter which comprises an optical fiber and a scanner for controlling the optical fiber to change a traveling path of light travelling towards the at least one liquid lens, the optical transmitter being provided between the narrowed first end part of the barrel and the at least one liquid lens.

13. The optical zoom probe of claim 1, further comprising an optical transmitter, which comprises an optical fiber and a scanner for controlling the optical fiber to change a traveling path of light travelling towards the at least one liquid lens, the optical transmitter being provided between the narrowed first end part of the barrel and the at least one liquid lens.

14. The optical zoom probe of claim 13, wherein the optical fiber is provided so as to pass through the first opening of the narrowed first end part.

15. The optical zoom probe of claim 1, wherein the at least one liquid lens comprises:
a transparent plate;
a lens barrel comprising a fluid filled therein and a hole in a side surface of the lens barrel so as to enable the fluid to pass through the flow path; and
a transparent membrane member located at an opposite side of the lens barrel from a side of the lens barrel at which the transparent plate is provided, the transparent member being formed to have a curved surface, and a curvature that changes according to an amount of the fluid filled in the lens barrel.

16. The optical zoom probe of claim 15, wherein the transparent plate, the lens barrel, and the transparent membrane member are provided plurally, and the at least one liquid lens comprises a first liquid lens and a second liquid lens respectively comprising a corresponding one of the transparent plate, the lens barrel, and the transparent membrane member, and
wherein the optical zoom probe further comprises a spacer provided between the first liquid lens and the second liquid lens.

* * * * *